United States Patent
Liu et al.

(10) Patent No.: US 11,979,210 B2
(45) Date of Patent: May 7, 2024

(54) METHOD AND DEVICE FOR CONTROLLING 5G ANTENNA, 5G TERMINAL AND COMPUTER READABLE STORAGE MEDIUM

(71) Applicant: ZTE CORPORATION, Guangdong (CN)

(72) Inventors: Fengpeng Liu, Guangdong (CN); Dongmei Liu, Guangdong (CN)

(73) Assignee: XI'AN ZHONGXING NEW SOFTWARE CO., LTD., Shaanxi (CN)

( * ) Notice: Subject to any disclaimer, the term of this patent is extended or adjusted under 35 U.S.C. 154(b) by 195 days.

(21) Appl. No.: 17/624,241

(22) PCT Filed: May 29, 2020

(86) PCT No.: PCT/CN2020/093120
§ 371 (c)(1),
(2) Date: Dec. 30, 2021

(87) PCT Pub. No.: WO2021/036377
PCT Pub. Date: Mar. 4, 2021

(65) Prior Publication Data
US 2022/0352938 A1    Nov. 3, 2022

(30) Foreign Application Priority Data
Aug. 26, 2019    (CN) .......................... 201910790862.1

(51) Int. Cl.
*H04B 7/06*    (2006.01)
*H01Q 1/24*    (2006.01)
(Continued)

(52) U.S. Cl.
CPC ........... *H04B 7/0608* (2013.01); *H01Q 1/243* (2013.01); *H04B 7/0404* (2013.01); *H04B 7/0834* (2013.01)

(58) Field of Classification Search
CPC .... H01Q 1/243; H04B 7/0404; H04B 7/0602; H04B 7/0608; H04B 7/0802;
(Continued)

(56) References Cited

U.S. PATENT DOCUMENTS 5,701,603 A * 12/1997 Norimatsu ............. H01Q 1/521
455/277.1
8,159,399 B2 * 4/2012 Dorsey .................... H01Q 3/24
343/702

(Continued)

FOREIGN PATENT DOCUMENTS

| CN | 105390803 A | 3/2016 |
|----|-------------|--------|
| CN | 105656526 A | 6/2016 |

(Continued)

OTHER PUBLICATIONS

ZTE Corporation, Extended European Search Report, EP 20859032.3, dated May 24, 2022, 16pgs.

(Continued)

*Primary Examiner* — Sophia Vlahos
(74) *Attorney, Agent, or Firm* — Li & Cai Intellectual Property (USA) Office

(57) ABSTRACT

A method and device for controlling a 5G antenna, and a 5G terminal are provided. The method includes: obtaining contacted situations of areas where a plurality of antennas are located on a terminal; determining whether a non-contacted area is present in the areas according to the contacted situations; in response to presence of the non-contacted area in the areas, selecting an antenna in the non-contacted area in a current scene for use; in response to absence of the
(Continued)

non-contacted area in the areas, obtaining influenced degrees of the plurality of antennas and determining whether the influenced degrees are the same; in response to the influenced degrees being the same, selecting an antenna from the plurality of antennas in the current scene for use; in response to the influenced degrees being different, selecting an antenna having the least influenced degree from the plurality of antennas in the current scene for use.

11 Claims, 7 Drawing Sheets

(51) Int. Cl.
*H04B 7/0404* (2017.01)
*H04B 7/08* (2006.01)

(58) Field of Classification Search
CPC .... H04B 7/0834; H04B 7/0604; H04B 7/082; H04B 7/0822; H04M 1/72454
See application file for complete search history.

(56) References Cited

U.S. PATENT DOCUMENTS

| | | | |
|---|---|---|---|
| 9,987,962 B1* | 6/2018 | Salter | B60N 2/90 |
| 10,554,285 B2* | 2/2020 | Son | H04B 7/0695 |
| 2005/0113039 A1* | 5/2005 | Tsukamoto | H04B 7/0814 |
| | | | 455/101 |
| 2011/0082615 A1* | 4/2011 | Small | B60K 37/06 |
| | | | 715/799 |
| 2012/0071203 A1* | 3/2012 | Wong | H04M 1/724 |
| | | | 455/550.1 |
| 2014/0235260 A1 | 8/2014 | Zawaideh et al. | |
| 2015/0358979 A1* | 12/2015 | Puranik | H04W 72/542 |
| | | | 455/452.2 |
| 2016/0141753 A1 | 5/2016 | Liou et al. | |
| 2016/0254850 A1 | 9/2016 | Chen et al. | |
| 2019/0006739 A1* | 1/2019 | Yu | H01Q 15/18 |
| 2019/0165486 A1* | 5/2019 | Yoshida | H04B 7/0608 |
| 2019/0190583 A1* | 6/2019 | Natarajan | H04B 7/0808 |
| 2020/0076488 A1* | 3/2020 | Brunel | H04B 7/063 |

FOREIGN PATENT DOCUMENTS

| | | |
|---|---|---|
| CN | 108337025 A | 7/2018 |
| CN | 108736160 A | 11/2018 |
| EP | 3352383 A1 | 7/2018 |
| JP | 2011151658 A | 8/2011 |
| WO | 2019109713 A1 | 6/2019 |

OTHER PUBLICATIONS

ZTE Corporation, International Search Report, PCT/CN2020/093120, dated Aug. 18, 2020, 5 pgs.

* cited by examiner

METHOD AND DEVICE FOR CONTROLLING 5G ANTENNA, 5G TERMINAL AND COMPUTER READABLE STORAGE MEDIUM

CROSS REFERENCE TO RELATED APPLICATIONS

The present disclosure is a United States National Stage Application filed under 35 U.S.C. § 371 of PCT Patent Application Serial No. PCT/CN2020/093120, filed May 29, 2020, which claims priority to Chinese patent application No. 201910790862.1, filed on Aug. 26, 2019, each of which is incorporated by reference herein in its entirety.

TECHNICAL FIELD

The present disclosure relates to the field of antenna control technology, for example, to a method and device for controlling a 5G antenna, a 5G terminal, and a non-transitory computer readable storage medium.

BACKGROUND

With the development of science and technology, users have an increasingly strong demand for faster data transmission and better mobile devices in the era of mobile Internet and Internet of Things. The research and development of the 5th generation mobile communication system (5G) has become a general trend. Research on antennas of a 5G terminal is urgently desired in order to meet the needs of 5G communication and the requirements of the 5G terminal on antennas.

The antenna is a key component in information transmission and reception of the mobile communication system, and its performance directly determines the reliability of the mobile communication system. The conventional miniaturization technology of 2G/3G/4G antennas is very mature, but in the millimeter-wave frequency band, new requirements on such as gain performance and an antenna array of the 5G antenna are put forward due to change of the spatial transmission distance and antenna pattern. When the performance of the antenna is unable to meet the requirements, the communication quality may be reduced and the data flow may slow down.

In related technologies, a conventional solution mainly adopts the way of avoiding to solve the problem that the communication performance is affected due to random medium being close to or in contact with the antenna, that is, the antenna is designed to be far away from an exterior surface of the terminal. Disadvantages of this solution are that the modeling may look massive and popular materials such as ceramic and metal are unable to be used. In other words, the industry has sacrificed the antenna performance when the medium is in contact with the antenna in order to ensure aesthetic modeling of the terminal. While in the design of the 5G antenna, the antenna performance is sacrificed even more because the 5G antenna is more sensitive.

With respect to a 4G terminal, since the number of antennas provided thereon is small, antenna switching is a single channel and the criterion for the antenna switching is relatively convenient. Usually, a received signal strength indication (RSSI) value is used to control the antenna switching. However, there are a large number of antennas on the 5G terminal, and the number of antennas affected by changes in the external environment such as hand holding is also large. Moreover, the control of the 5G antenna requires software to identify the correspondence among multiple signals and then compare and judge the signals. After that, a switching action may be performed. This makes the delay of a switching time of the 5G antenna far greater than that of a switching time of the 4G antenna. Once the signal fluctuates slightly, it is inevitable that repeated switching of signals occurs, i.e., a "ping-pong effect". In the process of the switching, circumstances such as being unbale to camp on a network, losing the network and call drops may occur on the mobile phone.

SUMMARY

The present disclosure provides a method and device for controlling a 5G antenna, a 5G terminal, and a non-transitory computer readable storage medium, which may avoid the software recognition obstacle and ping-pong effect of antenna switching, thereby improving logic processing speed and network switching stability.

A method for controlling a 5G antenna is provided, including: obtaining contacted situations of areas where a plurality of antennas are located on a terminal; determining whether a non-contacted area is present in the areas where the plurality of antennas are located according to the contacted situations of the areas where the plurality of antennas are located; in response to the presence of the non-contacted area in the areas where the plurality of antennas are located, selecting an antenna in the non-contacted area in a current scene for use; in response to the absence of the non-contacted area in the areas where the plurality of antennas are located, obtaining influenced degrees of the plurality of antennas and determining whether the influenced degrees of the plurality of antennas are the same; in response to the influenced degrees of the plurality of antennas being the same, selecting an antenna from the plurality of antennas in the current scene for use; in response to the influenced degrees of the plurality of antennas being different, selecting an antenna having the least influenced degree from the plurality of antennas in the current scene for use.

A device for controlling a 5G antenna is further provided, including: a plurality of contact sensors, distributed at different positions of a frame of a terminal and configured to detect in real time contacted situations of areas where a plurality of antennas distributed on the frame of the terminal are located; a switch group corresponding to a current scene, configured to turn on or off the plurality of antennas; and a control unit, configured to receive the contacted situations of the areas where the plurality of antennas are located which are sent by the plurality of contact sensors, and determine whether a non-contacted area is present in the areas where the plurality of antennas are located according to the contacted situations of the areas where the plurality of antennas are located; in response to the presence of the non-contacted area in the areas where the plurality of antennas are located, select an antenna in the non-contacted area in the current scene for use by controlling the switch group; in response to the absence of the non-contacted area in the areas where the plurality of antennas are located, obtain influenced degrees of the plurality of antennas and determine whether the influenced degrees of the plurality of antennas are the same; in response to the influenced degrees of the plurality of antennas being the same, select an antenna from the plurality of antennas in the current scene for use by controlling the switch group; in response to the influenced degrees of the plurality of antennas being different, select an antenna having the least influenced degree from the plurality of antennas in the current scene for use by controlling the switch group.

A non-transitory computer readable storage medium is further provided, and the non-transitory computer readable storage medium is configured to store an executable program which, when executed by a processor, causes the processor to perform the method for controlling the 5G antenna described above.

DETAILED DESCRIPTION

A method and device for controlling a 5G antenna, a 5G terminal, and a non-transitory computer readable storage medium provided in the embodiments of the present disclosure will be described below with reference to the accompanying drawings.

Embodiment 1

Figure 1:
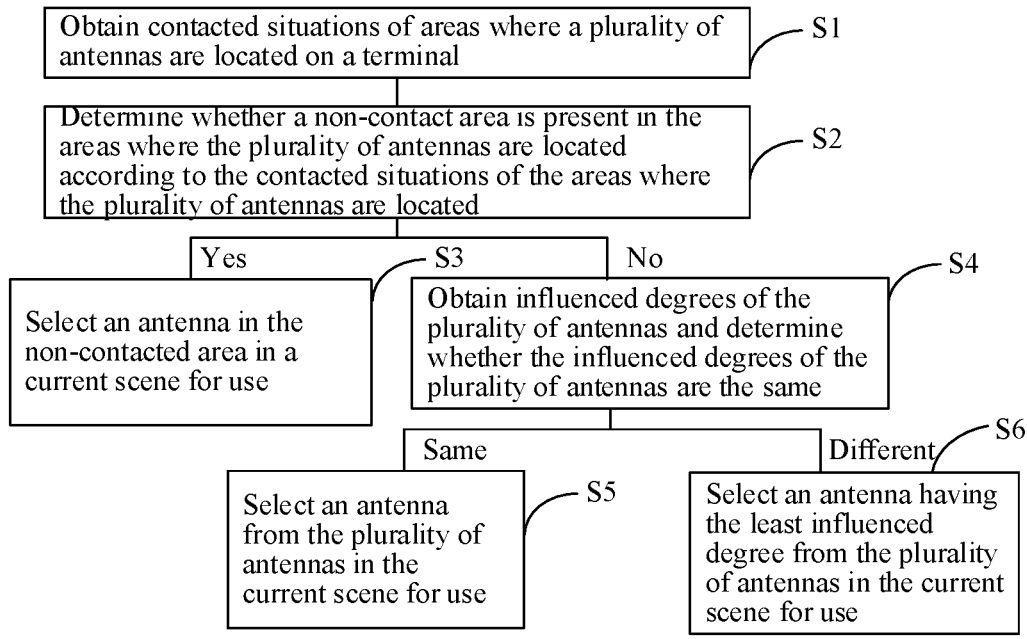
FIG. 1 is a flowchart of a method for controlling a 5G antenna provided in a first embodiment of the present disclosure.

Referring to FIG. 1, this embodiment provides a method for controlling a 5G antenna, which includes the following steps.

In step S1, contacted situations of areas where a plurality of antennas are located on a terminal are obtained.

Generally, a plurality of antennas are distributed on a frame at a periphery of a 5G terminal (such as a mobile phone), and a method for dividing the area where the plurality of antennas are located may be that, for example, the frame at the periphery of the 5G terminal is evenly divided into a plurality of areas and the plurality of antennas are provided in one-to-one correspondence with the plurality of areas.

In a complicated application environment, the terminal may be close to or in contact with some media which may influence performances of the antennas. The following four scenes may be taken as examples.

In scene 1, a user holds the terminal to make a call. The user's head and hand are in contact with the terminal or close to an area where the antenna is located, which has a great influence on communication.

In scene 2, the user holds the terminal to perform data services. The user's hand is in contact with or close to the area where the antenna is located, which has a great influence on communication.

In scene 3, the user carries the terminal in a standby state. The human body is close to the antennas of the terminal as a whole, which has a great influence on communication.

In scene 4, the user places the terminal in the standby state on a material panel. The material panel is in contact with the antennas, which has a great influence on communication. Moreover, dielectric constant values of different materials are different, and influenced degrees for the antennas are also different.

Figure 2:
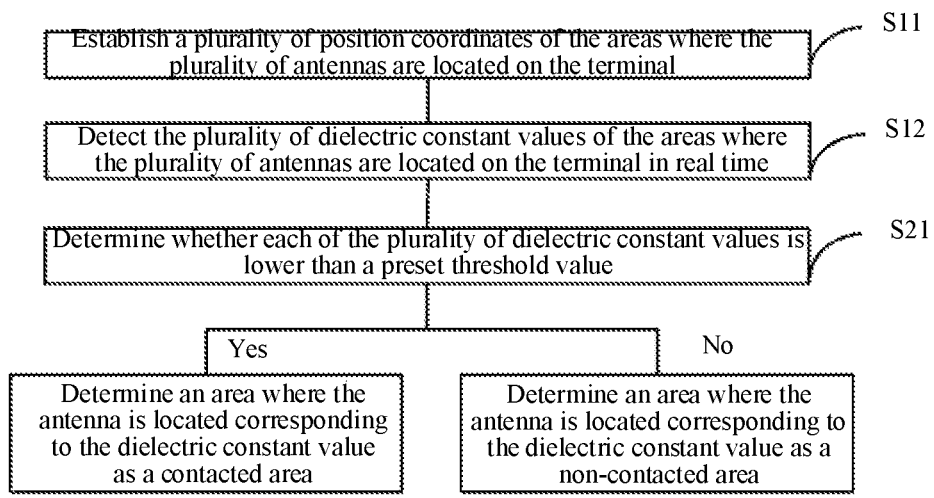
FIG. 2 is a flowchart of step S1 and step S2 provided in the first embodiment of the present disclosure.

Referring to FIG. 2, the above step S1 includes the following steps.

In step S11, a plurality of position coordinates of the areas where the plurality of antennas are located on the terminal are established.

Each of the areas where the plurality of antennas are located has uniquely determined coordinate information, so that the contacted situations of the plurality of areas may be identified and distinguished.

In step S12, the plurality of dielectric constant values of the areas where the plurality of antennas are located on the terminal are detected in real time.

When a medium is in contact with or close to one area of the terminal, a dielectric constant value of the area may change. By detecting the dielectric constant value of the area, the contacted condition may be known. For example, a plurality of contact sensors may be sequentially arranged on a frame of the terminal to monitor the dielectric constant values of the areas where the antennas on the frame are located in real time, so as to obtain a capacitance distribution map of the entire frame.

In step S2, whether a non-contacted area is present in the areas where the plurality of antennas are located is determined according to the contacted situations of the areas where the plurality of antennas are located.

As shown in FIG. 2, the step S2 includes the following steps.

In step S21, whether each of the plurality of dielectric constant values is less than a preset threshold value is determined; in response to a dielectric constant value being less than the preset threshold value, an area where an antenna is located corresponding to the dielectric constant value is determined as a contacted area; in response to a dielectric constant value not being less than the preset threshold value, an area where an antenna is located corresponding to the dielectric constant value is determined as the non-contacted area.

In step S3, in response to the presence of the non-contacted area in the areas where the plurality of antennas are located, an antenna in the non-contacted area is selected in a current scene for use.

In practical applications, if there are a plurality of non-contacted areas, an optimal antenna may be selected for use according to performances of the antennas in the plurality of non-contacted areas. For example, an antenna with the highest received signal strength indication (RSSI) value may be selected as the optimal antenna.

In step S4, in response to the absence of the non-contacted area in the areas where the plurality of antennas are located, influenced degrees of the plurality of antennas are obtained and whether the influenced degrees of the plurality of antennas are the same is determined; in response to the influenced degrees of the plurality of antennas being the same, step S5 is performed; in response to the influenced degrees of the plurality of antennas being different, step S6 is performed.

In step S5, an antenna is selected from the plurality of antennas in the current scene for use.

In step S6, an antenna having the least influenced degree is selected in the current scene for use.

In the method for controlling the 5G antenna provided in this embodiment, the antennas are switched based on the obtained contacted situations of the areas where the antennas are located as a switching criterion. In this way, the antennas may be switched logically only according to the contacted situations. Compared with a conventional method of using the RSSI value as a direct switching criterion, this method may avoid the software recognition obstacle and ping-pong effect of the antenna switching, thereby improving a logic processing speed and network switching stability.

In an example, in step S4, the influenced degrees of the antennas are determined according to the RSSI values of the antennas. The lower the RSSI value, the higher the influenced degree; the higher the RSSI value, the lower the influenced degree. In practical applications, other methods may also be used to determine the influenced degree of the antenna.

In an example, in the above step S5, an optimal antenna is selected for use according to the performances of the plurality of antennas. The factors considered for the performance of the antenna may include a gain performance, beam scanning angle, channel capacity, isolation, and the like.

In this embodiment, the use of antennas in the current scene is with respect to a use state of each of the plurality of antennas in the same scene. For example, in a scene where the user uses the terminal to make a call, the method for controlling the 5G antenna provided in this embodiment may be used to select an optimal antenna of the plurality of antennas as the antenna used in this call operation, that is "the use", rather than using remaining antennas. However, it does not mean that the remaining antennas are unable to be used in other scenes that coexist with the current scene, that is, different antennas may be used in different scenes at the same time, and the optimal antenna of the antennas is selected to be used in the same scene.

In practical applications, after the terminal is turned on, the contacted situations of the areas where the antennas on the terminal are located are obtained in real time, and the antennas are switched accordingly according to the changes of the contacted situations of the areas where the antennas are located, so as to ensure that the currently used antenna is always the optimal antenna.

In the method for controlling the 5G antenna provided in this embodiment, when the terminal is covered by, such as holding, the antennas may be switched to ensure that the currently used antenna is the optimal antenna after the judgment of the contacted area is completed. In this way, the antenna performance is greatly improved, communication experience of the user is improved, and the software recognition obstacle and the ping-pong effect of the antenna switching may be avoided, thereby improving the logic processing speed and the network switching stability.

Embodiment 2

Figure 3:
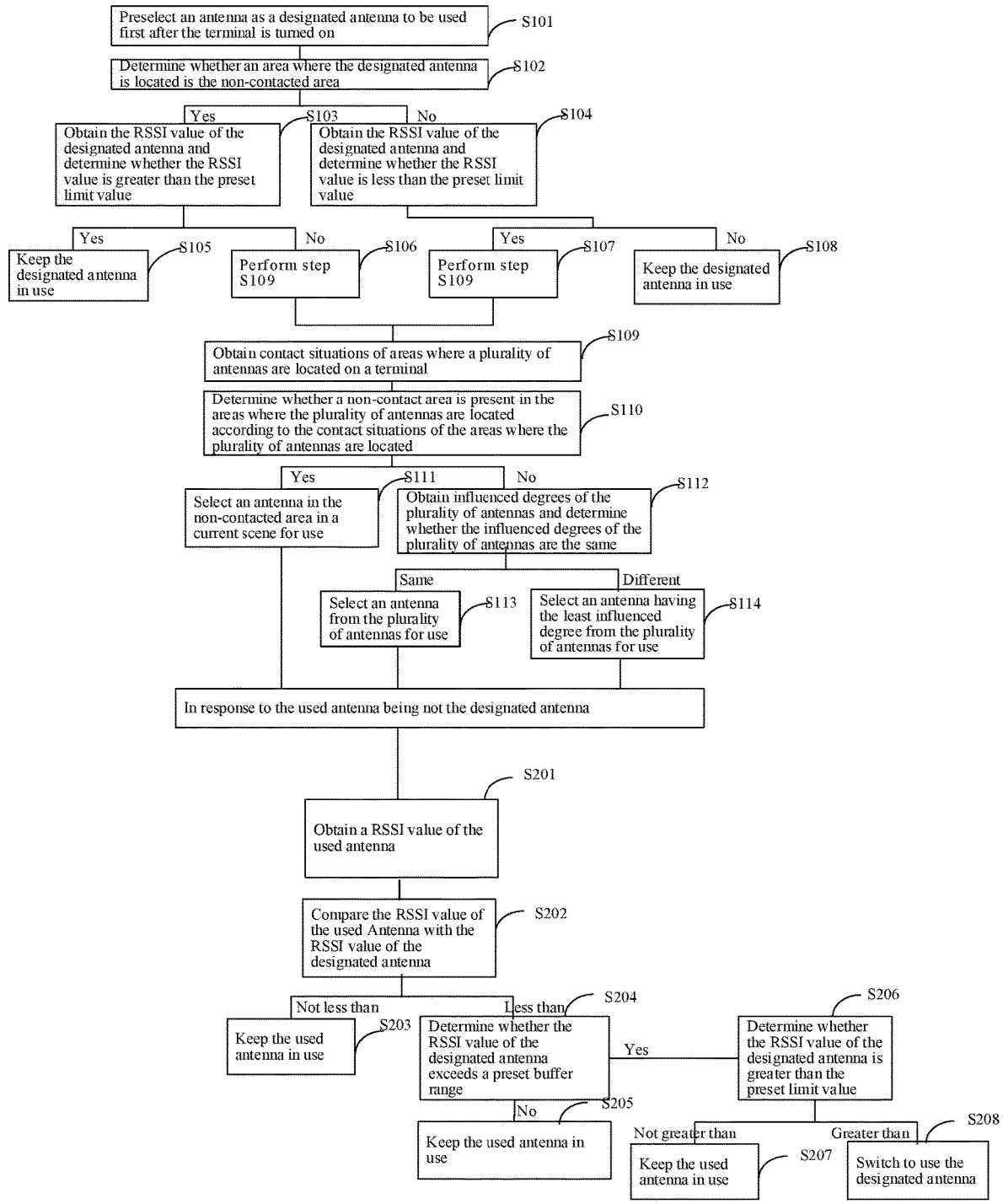
FIG. 3 is a flowchart of a method for controlling a 5G antenna provided in a second embodiment of the present disclosure.

A method for controlling a 5G antenna provided in this embodiment is an improvement made on the basis of the first embodiment described above. Referring to FIG. 3, the method for controlling the 5G antenna provided in this embodiment includes the following steps.

In step S101, an antenna is preselected as a designated antenna to be used first after a terminal is turned on.

The terminal has a default state after being turned on. In the default state, the antenna is designated as a default antenna for use.

In step S102, whether an area where the designated antenna is located is a non-contacted area is determined; in response to the area where the designated antenna is located being the non-contacted area, step S103 is performed; in response to the area where the designated antenna is located being a contacted area, step S104 is performed.

In step S103, a RSSI value of the designated antenna is obtained, and whether the RSSI value is greater than a preset limit value is determined; in response to the RSSI value being greater than the preset limit value, step S105 is performed; in response to the area where the RSSI value being not greater than the preset limit value, step S106 is performed.

In step S104, the RSSI value of the designated antenna is obtained, and whether the RSSI value is less than the preset limit value is determined; in response to the RSSI value being less than the preset limit value, step S107 is performed; in response to the RSSI value being not less than the preset limit value, step S108 is performed.

In step S105, the designated antenna is kept in use.
In step S106, step S109 is performed.
In step S107, step S109 is performed.
In step S108, the designated antenna is kept in use.
In step S109, contacted situations of the areas where the antennas on the terminal are located are obtained.

In step S110, whether a non-contacted area is present in the areas where the antennas are located is determined according to the contact situations of the areas where the antennas are located; in response to the presence of the non-contacted area in the areas where the antennas are located, step S111 is performed; in response to the absence of the non-contacted area in the areas where the antennas are located, step S112 is performed.

In step S111, an antenna in the non-contacted area is selected in a current scene for use.

In step S112, influenced degrees of the antennas are obtained, and whether the influenced degrees of the antennas are the same is determined; in response to the influenced degrees of the antennas being the same, step S113 is performed; in response to the influenced degrees of the antennas being different, step S114 is performed.

In step S113, an antenna is selected from the antennas in the current scene for use.

In step S114, an antenna having the least influenced degree is selected in the current scene for use.

In an example, as shown in FIG. 3, after the above step S111, after the above step S113, or after the above step S114, in response to the used antenna being not the designated antenna, the method further includes the following steps.

In step S201, a RSSI value of the used antenna is obtained.

In step S202, the RSSI value of the used antenna is compared with the RSSI value of the designated antenna; in response to the RSSI value of the used antenna being greater than or equal to the RSSI value of the designated antenna, step S203 is performed; in response to the RSSI value of the used antenna being less than the RSSI value of the designated antenna, step S204 is performed.

In step S203, the used antenna is kept in use.
In step S204, whether the RSSI value of the designated antenna exceeds a preset buffer range is determined; in response to the RSSI value of the designated antenna not exceeding the preset buffer range, step S205 is performed; in response to the RSSI value of the designated antenna exceeding the preset buffer range, step S206 is performed.

In step S205, the used antenna is kept in use.

In step S206, whether the RSSI value of the designated antenna is greater than the preset limit value is determined; in response to the RSSI value of the designated antenna being not greater than the preset limit value, step S207 is performed; in response to the RSSI value of the designated antenna being greater than the preset limit value, step S208 is performed.

In step S207, the used antenna is kept in use.

In step S208, the designated antenna is switched to use.

In response to the used antenna being not the designated antenna, by performing the above steps S201 to S208, whether to switch back to the designated antenna may be determined according to a comparison result of the RSSI value of the used antenna and the RSSI value of the designated antenna and a real-time change degree of the RSSI value of the designated antenna. In this way, the logic processing speed and network switching stability can be improved on the premise of ensuring that the currently used antenna is the optimal antenna.

In practical applications, it is possible to omit the above steps S204 to S205 and direct to the step S206.

Embodiment 3

Figure 4:
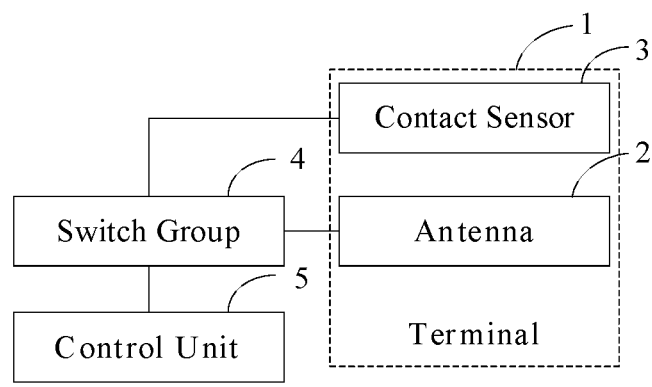
FIG. 4 is a functional block diagram of a device for controlling a 5G antenna provided in a third embodiment of the present disclosure.

This embodiment further provides a device for controlling a 5G antenna. As shown in FIG. 4, the device includes a plurality of contact sensors 3, a switch group 4 and a control unit 5. Herein, the plurality of contact sensors 3 are distributed at different positions of a frame of a terminal 1 and are configured to detect in real time contacted situations of areas where a plurality of antennas 2 distributed on the frame are located. In an example, the plurality of contact sensors 3 are medium capacitive contact detection sensors, or other sensors that are able to detect the contacted situations of the areas where the antennas 2 are located may also be used.

In practical applications, the contact sensors 3 may be continuously distributed around the frame of the terminal 1. The greater the distribution density of the contact sensors 3 (i.e., the greater the number of the contact sensors 3), the higher the detection accuracy is. In addition, feedback results of the plurality of contact sensors 3 may be distinguished by establishing position coordinates of the areas where the antennas are located on the terminal.

The switch group 4 corresponds to a current scene and is configured to turn on or off the plurality of antennas 2. The switch group 4 includes a first switch provided on a circuit between a radio frequency feed end and a radio frequency signal end of each of the plurality of antennas 2. And a second switch provided on a circuit between a ground end of each of the plurality of antennas 2 and a ground. When a first switch and a second switch are turned on at the same time, an antenna 2 corresponding to the switches are turned on. When a first switch and a second switch are turned off at the same time, an antenna 2 corresponding to the switches are turned off. In practical applications, the switch group may adopt a variety of connection modes between different antennas 2, such as a daisy chain, a loop, a series-parallel hybrid and the like.

The control unit 5 is configured to receive the contacted situations of the areas where the antennas 2 are located sent by the contact sensors 3, and determine whether a non-contacted area is present in the areas where the antennas 2 are located according to the contacted situations of the areas where the antennas 2 are located. In response to the presence of the non-contacted area in the areas where the antennas 2 are located, an antenna is selected from the antennas 2 in the non-contacted area in the current scene for use by controlling the switch group 4. In response to the absence of the non-contacted area in the areas where the antennas 2 are located, influenced degrees of the antennas 2 are obtained and whether the influenced degrees of the antennas 2 are the same is determined. In response to the influenced degrees of the antennas 2 being the same, an antenna is selected from the antennas 2 in the current scene by controlling the switch group 4. In response to the influenced degrees of the antennas 2 being different, an antenna having the least influenced degree is selected in the current scene for use by controlling the switch group 4.

Figure 5:
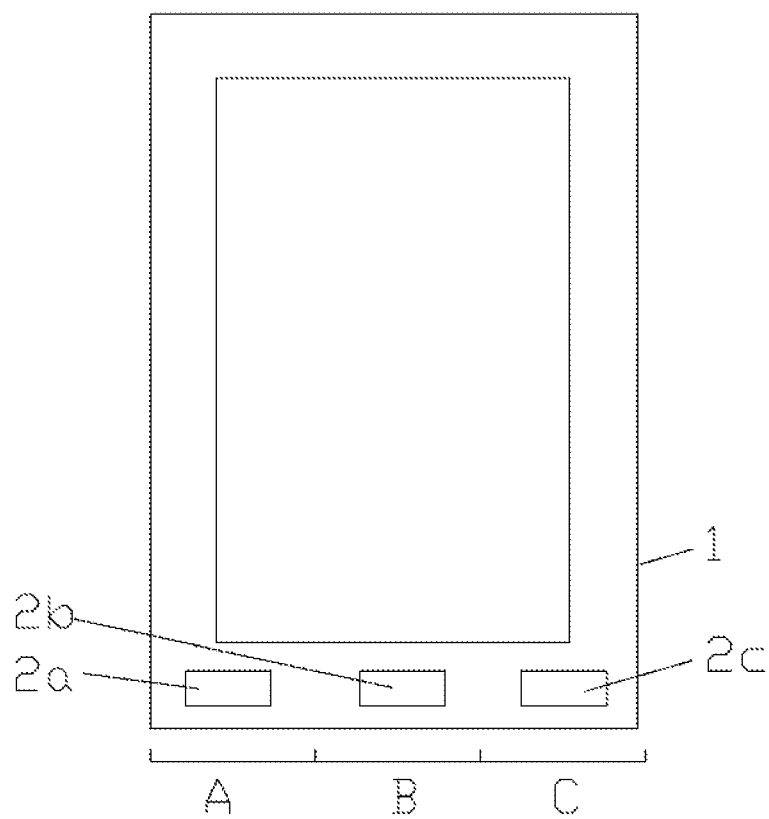
FIG. 5 is a diagram showing a distribution structure of antennas on a lower side of a terminal frame provided in the third embodiment of the present disclosure.

Referring to FIGS. 5 to 8, a case where a lower side of the frame of the terminal may be contacted is taken as an example in this embodiment to describe the device and method for controlling the 5G antenna provided in this embodiment. As shown in FIG. 5, the lower side of the frame of the terminal 1 is divided into three areas of equal size, namely area A, area B and area C. Three antennas (2a, 2b, 2c) are provided in the three areas (A, B, C) respectively.

Under the real-time monitoring of the plurality of contact sensors 3 distributed on the lower side of the frame, each respective contacted situation of each of the three areas (A, B, C) may be obtained, and the following contact trigger truth table may be used to indicate the respective contacted situation of the three areas (A, B, C). Herein, in response to an area being contacted, the area is marked as "1". And in response to an area being not contacted, the area is marked as "0".

TABLE 1

Contact Trigger Truth Table of The Three Areas (A, B, C).

| Area A | Area B | Area C | State |
|--------|--------|--------|-------|
| 0 | 0 | 0 | 0 |
| 0 | 0 | 1 | 1 |
| 0 | 1 | 0 | 2 |
| 0 | 1 | 1 | 3 |
| 1 | 0 | 0 | 4 |
| 1 | 0 | 1 | 5 |
| 1 | 1 | 0 | 6 |
| 1 | 1 | 1 | 7 |

From the above table 1, 8 possible touch states (0 to 7) may be obtained. Herein, state 0 means that no clear contact is detected in the three areas. In this state, an optimal antenna may be selected for use according to performances of the antennas in the plurality of non-contacted areas.

For state 1, clear contact is detected in the area C, and the antenna 2c in the area C is confirmed to be interfered. In this state, an optimal antenna may be selected from two antennas (2a, 2b) in the area A and area B for use. The method for controlling the antenna in state 2 and state 4 is the same as that in the state 1.

For state 3, clear contact is detected in the area B and area C, and the antennas (2b, 2c) in the area B and area C are confirmed to be interfered. In this state, the antenna 2a in the area A is used. The method for controlling the antenna in state 5 and state 6 is the same as that in state 3.

For state 7, clear contact is detected in all the three areas (A, B, C), and the three antennas (2a, 2b, 2c) are confirmed to be interfered. In this state, an optimal antenna may be selected according to the performances of the plurality of antennas.

Figure 6:
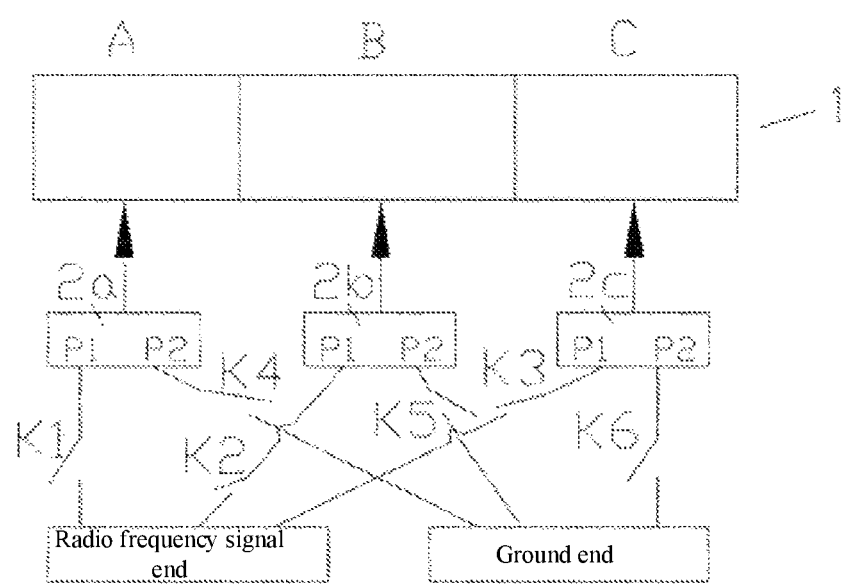
FIG. 6 is a schematic diagram of a switch link provided in the third embodiment of the present disclosure.
Figure 7:
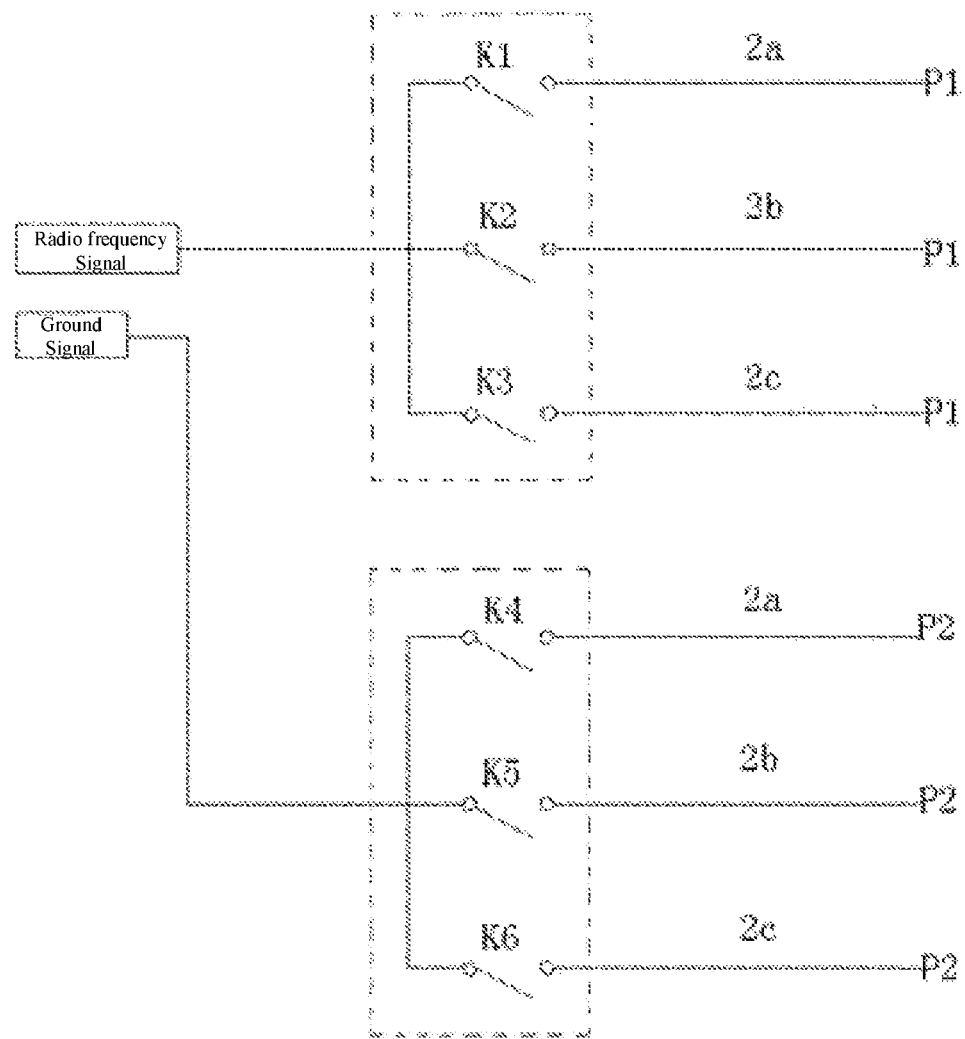
FIG. 7 is a schematic diagram of a switch circuit provided in the third embodiment of the present disclosure.

As shown in FIG. 6 and FIG. 7, the switch group includes three pairs of switches corresponding to the three antennas (2a, 2b, 2c). Herein, with respect to the antenna 2a, a first switch K1 is provided on a circuit between a radio frequency feed end P1 and a radio frequency signal end of the antenna 2a. A second switch K4 is provided on a circuit between a ground end P2 of the antenna 2a and a ground. By controlling the first switch K1 and the second switch K4 turn on or off at the same time, the antenna 2a may be controlled to turn on or off. Similarly, with respect to the antenna 2b, a first switch K2 is provided on a circuit between the radio frequency feed end P1 and the radio frequency signal end of the antenna 2b. A second switch K5 is provided on a circuit between the ground end P2 of the antenna 2b and the ground. With respect to the antenna 2c, a first switch K3 is provided on a circuit between the radio frequency feed end P1 and the radio frequency signal end of the antenna 2c. A second switch K6 is provided on a circuit between the ground end P2 of the antennas 2c and the ground.

Figure 8:
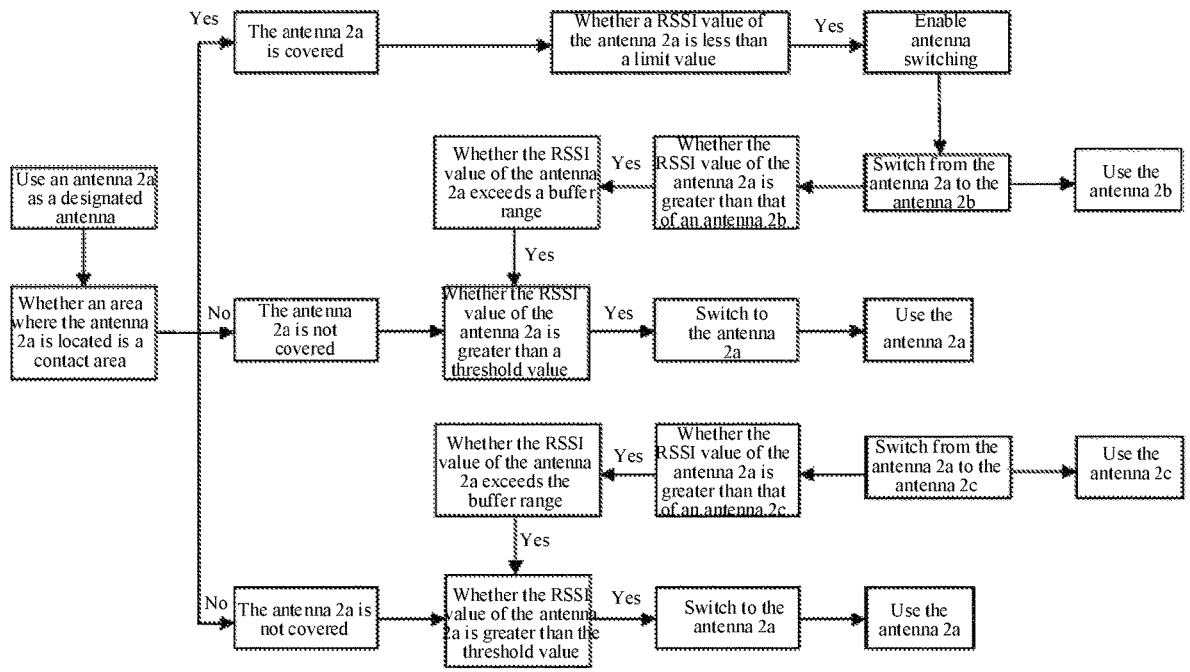
FIG. 8 is a flowchart of switch switching provided in the third embodiment of the present disclosure.
Figure 9:
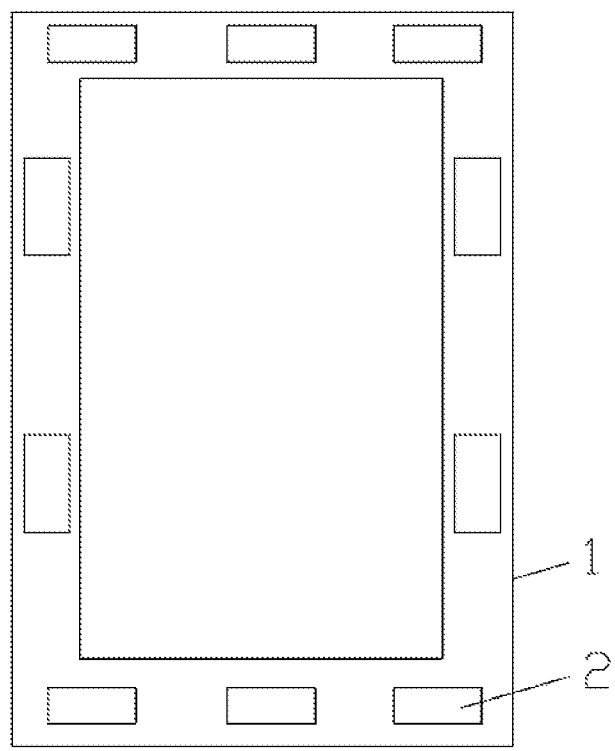
FIG. 9 is a schematic structural diagram of a 5G terminal provided in a fourth embodiment of the present disclosure.

In an example, FIG. 8 shows a flowchart of switching the three antennas (2a, 2b, 2c) using the method for controlling the 5G antenna provided in the second embodiment. This switching method is based on the obtained contacted situations of the areas where the antennas are located as the switching criterion. In this way, the antennas may be switched logically only according to the contacted situations. Compared with a conventional method of using the RSSI value as a direct switching criterion, this method may avoid the software recognition obstacle and ping-pong effect of the antenna switching, thereby improving a logic processing speed and network switching stability.

Embodiment 4

This embodiment further provides a 5G terminal including a plurality of antennas 2 which are distributed on a frame at a periphery of the 5G terminal and the device for controlling the 5G antenna provided in this embodiment.

The 5G terminal provided in this embodiment adopts the above device for controlling the 5G antenna in this embodiment, which maximizes antenna performance and communication experience of the user to the greatest possible extent, and also improves the logic processing speed and network switching stability.

The present disclosure further provides a non-transitory computer readable storage medium configured to store an executable program which, when executed by a processor, causes the processor to perform the method for controlling the 5G antenna provided in the present disclosure.

The non-transitory computer readable storage medium includes non-transitory medium implemented in any method or technology for storing information (such as computer readable instructions, data structures, program modules or other data). The non-transitory computer readable storage medium includes but is not limited to a random access memory (RAM), a read-only memory (ROM), an electrically erasable programmable read-only memory (EEPROM), a flash memory or other storage technology, a compact disc read-only memory (CD-ROM), a digital video disc (DVD) or other optical disc storage, a magnetic cartridge, a magnetic tape, a disk storage or other magnetic storage medium, or any other medium that is able to be configured to store desired information and be accessed by a computer.

What is claimed is:

1. A method tor controlling a fifth generation mobile communication system 5G antenna, comprising:

obtaining contacted situations of areas where a plurality of antennas are located on a terminal;

determining whether a non-contacted area is present in the areas where the plurality of antennas are located according to the contacted situations of the areas where the plurality of antennas are located;

in response to the presence of the non-contacted area in the areas where the plurality of antennas are located, selecting an antenna in the non-contacted area in a current scene for use; and in response to the absence of the non-contacted area in the areas where the plurality of antennas are located, obtaining influenced degrees of the plurality of antennas and determining whether the influenced degrees of the plurality of antennas are the same; in response to the influenced degrees of the plurality of antennas being the same, selecting an antenna from the plurality of antennas in the current scene for use; in response to the influenced degrees of the plurality of antennas being different, selecting an antenna having the least influenced degree from the plurality of antennas in the current scene for use, wherein before obtaining the contacted situations of the areas where the plurality of antennas are located on the terminal, the method further comprises:

preselecting an antenna as a designated antenna to be used first after the terminal is turned on;

determining whether an area where the designated antenna is located is the non-contacted area;

in response to the area where the designated antenna is located being the non-contacted area, obtaining a received signal strength indicator value of the designated antenna and determining whether the received signal strength indicator value is greater than a preset limit value; in response to the received signal strength indicator value being greater than the preset limit value, keeping the designated antenna in use; in response to the received signal strength indicator value being not greater than the preset limit value, performing a step of obtaining the contacted situations of the areas where the plurality of antennas are located on the terminal; and in response to the area where the designated antenna is located being a contacted area, obtaining the received signal strength indicator value of the designated antenna and determining whether the received signal strength indicator value is less than the preset limit value; in response to the received signal strength indication value being less than the preset limit value, performing the step of obtaining the contacted situations of the areas where the plurality of antennas are located on the terminal; in response to the received signal strength indicator value being not less than the preset limit value, keeping the designated antenna in use.

2. The method according to claim 1, wherein obtaining the contacted situations of the areas where the plurality of antennas are located on the terminal comprises:

establishing a plurality of position coordinates of the areas where the plurality of antennas are located on the terminal; and receiving a plurality of dielectric constant values of the areas where the plurality of antennas are located on the terminal according to the plurality of position coordinates, wherein the plurality of dielectric constant values are detected in real time and are used to characterize the contacted situations of the areas where the plurality of antenna are located;

wherein determining whether the non-contacted area is present in the areas where the plurality of antennas are located according to the contacted situations of the areas where the plurality of antennas are located comprises:

determining whether each of the plurality of dielectric constant values is less than a preset threshold value; in response to a dielectric constant value being less than the preset threshold value, determining that an area where an antenna is located corresponding to the dielectric constant value is a contacted area; in response to a dielectric constant value not being less than the preset threshold value, determining that an area where an antenna is located corresponding to the dielectric constant value is the non-contacted area.

3. The method according to claim 1, wherein obtaining the influenced degrees of the plurality of antennas comprises:

determining each respective influenced degree of each of the plurality of antennas according to a received signal strength indicator value of each of the plurality of antennas.

4. The method according to claim 1, wherein selecting the antenna in the non-contacted area in the current scene for use comprises:

in response to the presence of a plurality of non-contacted areas in the areas where the plurality of antennas are located, selecting an optimal antenna in the current scene for use according to performances of antennas in each of the plurality of non-contacted areas.

5. The method according to claim 1, wherein selecting the antenna from the plurality of antennas in the current scene for use comprises:

selecting an optimal antenna in the current scene for use according to a performance of each of the plurality of antennas.

6. The method according to claim 1, wherein after selecting the antenna in the non-contacted area in the current scene for use, or after obtaining the influenced degrees of the plurality of antennas and determining whether the influenced degrees of the plurality of antennas are the same; in response to the influenced degrees of the plurality of antennas being the same, selecting the antenna from the plurality of antennas in the current scene for use; in response to the influenced degrees of the plurality of antennas being different, selecting an antenna having the least influenced degree from the plurality of antennas in the current scene for use, the method further comprises:

in response to the used antenna being not the designated antenna, obtaining a received signal strength indicator value of the used antenna;

comparing the received signal strength indicator value of the used antenna with the received signal strength indicator value of the designated antenna;

in response to the received signal strength indicator value of the used antenna being greater than or equal to the received signal strength indicator value of the designated antenna, keeping the used antenna in use; and in response to the received signal strength indicator value of the used antenna being less than the received signal strength indicator value of the designated antenna, determining whether the received signal strength indicator value of the designated antenna is greater than the preset limit value; in response to the received signal strength indicator value of the designated antenna being not greater than the preset limit value, keeping the used antenna in use; in response to the received signal strength indicator value of the designated antenna being greater than the preset limit value, switching to use the designated antenna.

7. A device for controlling a 5G antenna, comprising:

a plurality of contact sensors, distributed at different positions of a frame of a terminal and configured to detect in real time contacted situations of areas where a plurality of antennas distributed on the frame of the terminal are located;

a switch group corresponding to a current scene, configured to turn on or off the plurality of antennas; and a control unit, configured to receive the contacted situations of the areas where the plurality of antennas are located which are sent by the plurality of contact sensors, and determine whether a non-contacted area is present in the areas where the plurality of antennas are located according to the contacted situations of the areas where the plurality of antennas are located; in response to the presence of the non-contacted area in the areas where the plurality of antennas are located, select an antenna in the non-contacted area in the current scene for use by controlling the switch group; in response to the absence of the non-contacted area in the areas where the plurality of antennas are located, obtain influenced degrees of the plurality of antennas and determine whether the influenced degrees of the plurality of antennas are the same; in response to the influenced degrees of the plurality of antennas being the same, select an antenna from the plurality of antennas in the current scene for use by controlling the switch group; in response to the influenced degrees of the plurality of antennas being different, select an antenna having the least influenced degree from the plurality of antennas in the current scene for use by controlling the switch group, wherein before receiving the contacted situations of the areas where the plurality of antennas are located on the terminal, the control unit is further configured to:

preselect an antenna as a designated antenna to be used first after the terminal is turned on;

determine whether an area where the designated antenna is located is the non-contacted area;

in response to the area where the designated antenna is located being the non-contacted area, obtain a received signal strength indicator value of the designated antenna and determine whether the received signal strength indicator value is greater than a preset limit value; in response to the received signal strength indicator value being greater than the preset limit value, keep the designated antenna in use; in response to the received signal strength indicator value being not greater than the preset limit value, receive the contacted situations of the areas where the plurality of antennas are located on the terminal; and in response to the area where the designated antenna is located being a contacted area, obtain the received signal strength indicator value of the designated antenna and determine whether the received signal strength indicator value is less than the preset limit value; in response to the received signal strength indication value being less than the preset limit value, receive the contacted situations of the areas where the plurality of antennas are located on the terminal; in response to the received signal strength indicator value being not less than the preset limit value, keep the designated antenna in use.

8. The device according to claim 7, wherein the switch group comprises:
   a first switch, provided on a circuit between a radio frequency feed end and a radio frequency signal end of each of the plurality of antennas; and
   a second switch, provided on a circuit between a ground end of each of the plurality of antennas and a ground.

9. A 5G terminal, comprising:
   a plurality of antennas, distributed on a frame at a periphery of the 5G terminal; and
   a device for controlling a 5G antenna, wherein the device comprises:
   a plurality of contact sensors, distributed at different positions of a frame of a terminal and configured to detect in real time contacted situations of areas where a plurality of antennas distributed on the frame of the terminal are located;
   a switch group corresponding to a current scene, configured to turn on or off the plurality of antennas; and
   a control unit, configured to receive the contacted situations of the areas where the plurality of antennas are located which are sent by the plurality of contact sensors, and determine whether a non-contacted area is present in the areas where the plurality of antennas are located according to the contacted situations of the areas where the plurality of antennas are located; in response to the presence of the non-contacted area in the areas where the plurality of antennas are located, select an antenna in the non-contacted area in the current scene for use by controlling the switch group; in response to the absence of the non-contacted area in the areas where the plurality of antennas are located, obtain influenced degrees of the plurality of antennas and determine whether the influenced degrees of the plurality of antennas are the same; in response to the influenced degrees of the plurality of antennas being the same, select an antenna from the plurality of antennas in the current scene for use by controlling the switch group; in response to the influenced degrees of the plurality of antennas being different, select an antenna having the least influenced degree from the plurality of antennas in the current scene for use by controlling the switch group,
   wherein before receiving the contacted situations of the areas where the plurality of antennas are located on the terminal, the control unit is further configured to:
   preselect an antenna as a designated antenna to be used first after the terminal is turned on;
   determine whether an area where the designated antenna is located is the non-contacted area;
   in response to the area where the designated antenna is located being the non-contacted area, obtain a received signal strength indicator value of the designated antenna and determine whether the received signal strength indicator value is greater than a preset limit value; in response to the received signal strength indicator value being greater than the preset limit value, keep the designated antenna in use; in response to the received signal strength indicator value being not greater than the preset limit value, receive the contacted situations of the areas where the plurality of antennas are located on the terminal; and
   in response to the area where the designated antenna is located being a contacted area, obtain the received signal strength indicator value of the designated antenna and determine whether the received signal strength indicator value is less than the preset limit value; in response to the received signal strength indication value being less than the preset limit value, receive the contacted situations of the areas where the plurality of antennas are located on the terminal; in response to the received signal strength indicator value being not less than the preset limit value, keep the designated antenna in use.

10. A non-transitory computer readable storage medium, configured to store an executable program which, when executed by a processor, cause the processor to perform the method for controlling the 5G antenna according to claim 1.

11. The terminal according to claim 9, wherein the switch group comprises:
   a first switch, provided on a circuit between a radio frequency feed end and a radio frequency signal end of each of the plurality of antennas; and
   a second switch, provided on a circuit between a ground end of each of the plurality of antennas and a ground.

* * * * *